US010899179B2

(12) United States Patent
Hayashi et al.

(10) Patent No.: US 10,899,179 B2
(45) Date of Patent: Jan. 26, 2021

(54) MOTORCYCLE TIRE AND TIRE SET (71) Applicant: BRIDGESTONE CORPORATION, Tokyo (JP)

(72) Inventors: Shintaro Hayashi, Hachioji (JP); Yasufumi Tokitoh, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 16/660,126

(22) Filed: Oct. 22, 2019

(65) Prior Publication Data

US 2020/0047558 A1 Feb. 13, 2020

Related U.S. Application Data

(63) Continuation-in-part of application No. 15/515,613, filed as application No. PCT/JP2015/004016 on Aug. 10, 2015, now abandoned.

(30) Foreign Application Priority Data

Oct. 1, 2014 (JP) ................................ 2014-203364

(51) Int. Cl.
 *B60C 11/03* (2006.01)
 *B60C 11/00* (2006.01)
(52) U.S. Cl.
 CPC ... *B60C 11/0304* (2013.01); *B60C 2011/0372* (2013.01); *B60C 2011/0383* (2013.01); *B60C 2200/10* (2013.01)
(58) Field of Classification Search
 None
 See application file for complete search history.

(56) References Cited

U.S. PATENT DOCUMENTS

D490,770 S 6/2004 Isaka
2006/0185776 A1 8/2006 Lu
(Continued)

FOREIGN PATENT DOCUMENTS

CN 101595002 A 12/2009
EP 0855291 A2 7/1998
(Continued)

OTHER PUBLICATIONS

Search Report dated Jul. 24, 2018 from the State Intellectual Property Office of the P.R.C. in counterpart application No. 2015800535201.

(Continued)

*Primary Examiner* — Kendra Ly
(74) *Attorney, Agent, or Firm* — Sughrue Mion, PLLC (57) ABSTRACT

A tire used for the motorcycle tire and tire set includes: a crossing groove and a non-crossing groove. A groove group of the crossing groove and the non-crossing groove is repeatedly provided in tire circumferential direction so that adjacent groove groups are symmetric with respect to a tire equatorial plane. First, second, and fifth groove portions extend toward one side in tire circumferential direction and third and fourth groove portions extend toward the other side in tire circumferential direction. A first bend portion is located in a shoulder region nearer the one tread edge, a second bend portion is located in a middle region nearer the one tread edge, and a third bend portion is located in a middle region nearer the other tread edge. Inclination angles of the second, fourth and fifth groove portions are each larger than an inclination angle of the first groove portion.

14 Claims, 3 Drawing Sheets

(56) References Cited

U.S. PATENT DOCUMENTS

2010/0132864 A1    6/2010   Colombo et al.
2011/0162769 A1    7/2011   Mariani et al.

FOREIGN PATENT DOCUMENTS

| JP | 7-164826 A | 6/1995 |
| JP | 2001-10310 A | 1/2001 |
| JP | 2001-39120 A | 2/2001 |
| JP | 2001-071711 A | 3/2001 |
| JP | 2006-076519 A | 3/2006 |
| JP | 2006-240503 A | 9/2006 |
| JP | 2007-290538 A | 11/2007 |
| JP | 2009-101743 A | 5/2009 |
| JP | 4434364 B2 | 3/2010 |
| JP | 2010-513117 A | 4/2010 |
| JP | 2013-163446 A | 8/2013 |
| JP | 2013-193518 A | 9/2013 |
| JP | 2014-198498 A | 10/2014 |

OTHER PUBLICATIONS

International Search Report for PCT/JP2015/004016 dated Sep. 15, 2015 [PCT/ISA/210].

MOTORCYCLE TIRE AND TIRE SET

CROSS REFERENCE TO RELATED APPLICATIONS

This application is a Continuation-in-Part of U.S. application Ser. No. 15/515,613, filed Mar. 30, 2017, which is a National Stage of International Application No. PCT/JP2015/004016, filed on Aug. 10, 2015, which claims priority from Japanese Patent Application No. 2014-203364, filed on Oct. 1, 2014, the contents of all of which are incorporated herein by reference in their entirety.

TECHNICAL FIELD

The disclosure relates to a motorcycle tire and a tire set.

BACKGROUND

Various motorcycle tires having both steering stability and drainage performance have been conventionally proposed. For example, JP 2001-39120 A (PTL 1) proposes the following tire. The tire has, in its tread surface: an inverted V-shaped first groove (first portion, second portion) that extends to near each tread edge and has a bend portion located on the side of the tire equatorial plane nearer one tread edge; and a second groove (third portion) that is adjacent to the first groove in the tire circumferential direction, extends from near the one tread edge approximately in parallel with the first groove, and communicates with the first groove on the side of the tire equatorial plane nearer the other tread edge. A groove group made up of the first groove and the second groove as a set is repeatedly provided in the tire circumferential direction so that adjacent groove groups are symmetric with respect to the tire equatorial plane. Here, the positions of the bend portion of the first groove and the communication portion of the first and second grooves are defined, and also the inclination angle of each groove is defined within a predetermined region from the tire equatorial plane to each side in the tire width direction.

CITATION LIST

Patent Literature

PTL 1: JP 2001-39120 A

SUMMARY

Technical Problem

Although the aforementioned motorcycle tire has both steering stability and drainage performance, there is a need to achieve both steering stability and drainage performance at a higher level.

It could therefore be helpful to provide a motorcycle tire and tire set having both high steering stability and high drainage performance.

Solution to Problem

A motorcycle tire according to the disclosure is a motorcycle tire comprising:
a crossing groove crossing between tread edges; and
a non-crossing groove adjacent to the crossing groove in a tire circumferential direction, and extending from one tread edge and not reaching an other tread edge,
wherein the crossing groove has three bend portions, which are a first bend portion to a third bend portion in order from the one tread edge, and has four groove portions, which are a first groove portion, between the one tread edge and the first bend portion, to a fourth groove portion, between the third bend portion and the other tread edge, in order from the one tread edge, the first groove portion to the fourth groove portion being delimited at the first bend portion to the third bend portion,
the non-crossing groove has a fifth groove portion extending at least in a region between the one tread edge and a position of 45% of a tread half width from a tire equatorial plane toward the one tread edge,
the first groove portion, the second groove portion, and the fifth groove portion extend toward one side in the tire circumferential direction and the third groove portion and the fourth groove portion extend toward an other side in the tire circumferential direction, in a direction from the one tread edge to the other tread edge,
a groove group made up of the crossing groove and the non-crossing groove adjacent to the crossing groove in the tire circumferential direction as a set is repeatedly provided in the tire circumferential direction so that adjacent groove groups are symmetric with respect to the tire equatorial plane,
when, in a tread surface, a region of less than 10% of the tread half width from the tire equatorial plane toward each of the tread edges is referred to as a center region, a region of 10% or more and 45% or less of the tread half width from the tire equatorial plane toward each of the tread edges is referred to as a middle region, and a region of more than 45% of the tread half width from the tire equatorial plane toward each of the tread edges is referred to as a shoulder region,
  the first bend portion is located in the shoulder region nearer the one tread edge,
  the second bend portion is located in the middle region nearer the one tread edge,
  the third bend portion is located in the middle region nearer the other tread edge, and
  respective inclination angles of the second groove portion, the fourth groove portion, and the fifth groove portion with respect to the tire circumferential direction are each larger than an inclination angle of the first groove portion with respect to the tire circumferential direction.

With this structure, both steering stability and drainage performance can be enhanced.

In the disclosure, "tread half width" indicates the tread widthwise length measured from the tire equatorial plane to the tread edge along the tread surface, in a no-load state (hereafter referred to as "reference state") in which the tire is attached to an applicable rim with no internal pressure being applied. The term "applicable rim" means an approved rim ("measuring rim" in ETRTO Standards Manual, "design rim" in TRA Year Book) in applicable size described in an effective industrial standard in areas where tires are produced or used, such as JATMA (Japan Automobile Tyre Manufacturers Association) Year Book in Japan, ETRTO (European Tyre and Rim Technical Organisation) Standards Manual in Europe, or TRA (Tire and Rim Association, Inc.) Year Book in the United States. The expression "no internal pressure is applied" means internal pressure is not applied to the tire, but applying low internal pressure for merely maintaining the shape of the case line of the tire, such as about 30 kPa, is allowable.

In the disclosure, the dimensions, angles, etc. defining each region are also measured along the tread surface in the reference state, unless otherwise noted.

In the disclosure, the inclination angle of each groove portion with respect to the tire circumferential direction is the smaller one of the angles.

Preferably, the non-crossing groove has at least one bend portion including a fourth bend portion that is nearest the one tread edge and is located in the middle region nearer the one tread edge, and the fifth groove portion extends in a region between the one tread edge and the fourth bend portion. With this structure, both steering stability and drainage performance can be enhanced efficiently.

Preferably, a bend portion angle of the second bend portion is smallest of respective bend portion angles of the first bend portion to the fourth bend portion. With this structure, both drainage performance and steering stability can be enhanced more efficiently.

Here, "bend portion angle" indicates the smaller one of the angles formed between the respective centerlines that pass through the groove width centers of the two groove portions adjacent to the bend portion and extend to the bend portion.

Preferably, the first bend portion is located in a region of 50% or more and 65% or less of the tread half width from the tire equatorial plane toward the tread edge. With this structure, both drainage performance and steering stability can be enhanced more efficiently.

Preferably, an auxiliary groove terminating within a land portion at both ends is provided on an extended line of the non-crossing groove of the groove group, between the crossing groove of the groove group and the non-crossing groove of an adjacent groove group adjacent to one of the groove groups. With this structure, steering stability can be further improved while maintaining favorable wear resistance.

Preferably, an inclination angle of the third groove portion with respect to the tire circumferential direction is smaller than the inclination angle of the first groove portion with respect to the tire circumferential direction. With this structure, the tire circumferential rigidity of the center region is relatively high, so that steering stability during straight running is further improved.

In this case, preferably, the inclination angle of the first groove portion with respect to the tire circumferential direction is in a range of 30° to 45°, and the inclination angle of the third groove portion with respect to the tire circumferential direction is in a range of 15° to 32°. With this structure, both drainage performance and steering stability can be improved more effectively.

Preferably, at each of respective openings of the first groove portion, the fourth groove portion, and the fifth groove portion to the tread edge, a land portion adjacent to the respective groove portion is chamfered to increase a groove width of the respective groove portion. With this structure, the end of the land portion can be prevented from chipping.

Preferably, the motor cycle tire is for use as a rear tire of a motorcycle, and a rotation direction of the motor cycle tire is a direction from the other side in the tire circumferential direction to the one side in the tire circumferential direction. Such a tire is suitable as a rear tire.

Preferably, an inclination angle of the third groove portion with respect to the tire circumferential direction is larger than the inclination angle of the first groove portion with respect to the tire circumferential direction. With this structure, the tire widthwise rigidity of the center region is relatively high, so that steering stability during cornering is further improved.

In this case, preferably, the inclination angle of the first groove portion with respect to the tire circumferential direction is in a range of 35° to 45°, and the inclination angle of the third groove portion with respect to the tire circumferential direction is in a range of 45° to 55°. With this structure, drainage performance and responsiveness can be improved more effectively.

Preferably, at each of respective openings of the first groove portion, the fourth groove portion, and the fifth groove portion to the tread edge, a land portion adjacent to the respective groove portion is chamfered to increase a groove width of the respective groove portion. With this structure, the end of the land portion can be prevented from chipping.

Preferably, the motorcycle tire is for use as a front tire of a motorcycle, and a rotation direction of the motorcycle tire is a direction from the one side in the tire circumferential direction to the other side in the tire circumferential direction. Such a tire is suitable as a front tire.

A tire set according to the disclosure comprises, as a set, the motorcycle tire for use as a rear tire and the motorcycle tire for use as a front tire to be mounted on a same motorcycle. The use of these tires as a set is preferable in terms of drainage performance and steering stability.

Advantageous Effect

It is thus possible to provide a motorcycle tire and tire set having both high steering stability and high drainage performance.

DETAILED DESCRIPTION

The following describes some of the disclosed embodiments with reference to drawings.

Figure 1:
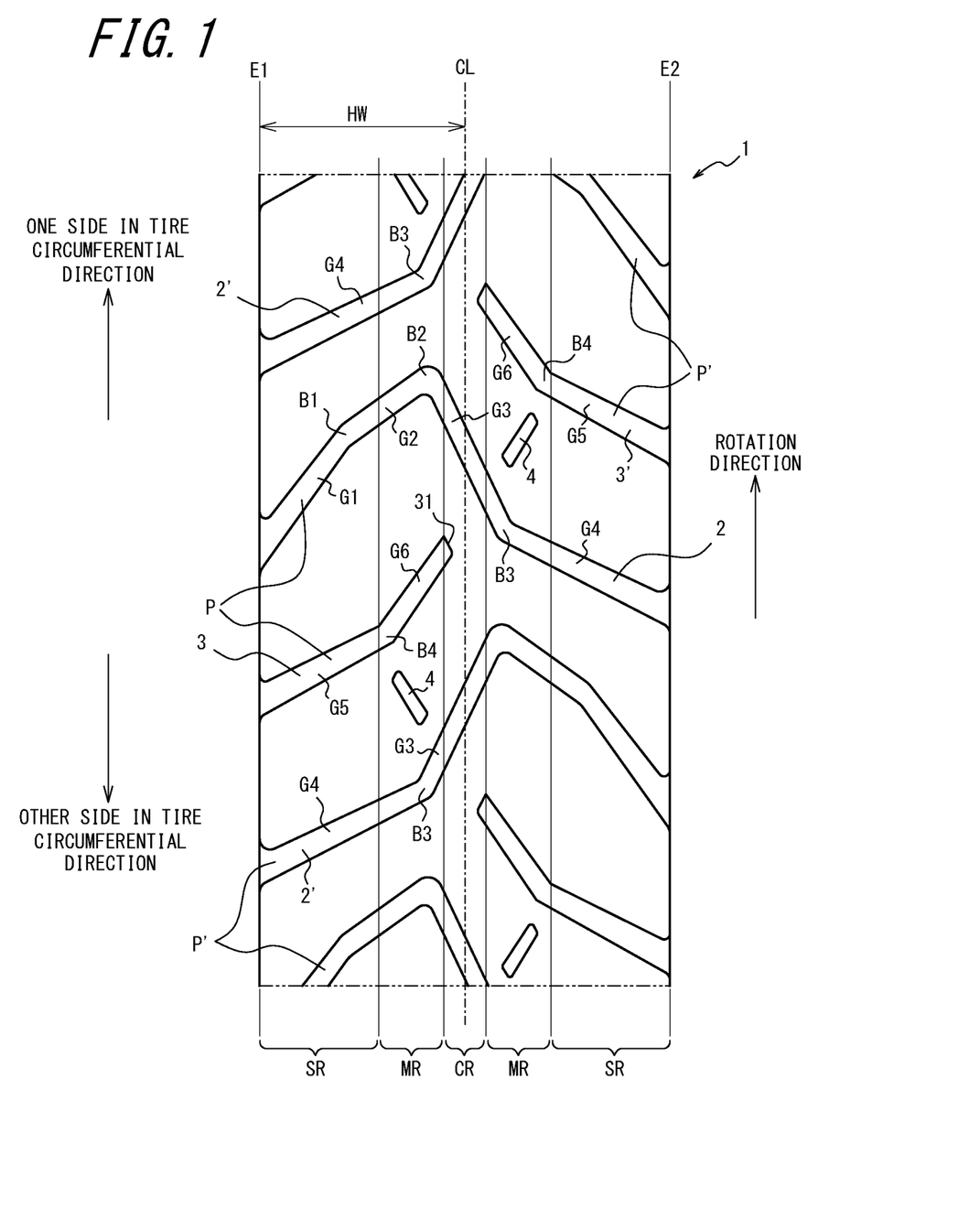
FIG. 1 is a developed view illustrating a tread pattern of a motorcycle tire according to Embodiment 1.

FIG. 1 is a developed view illustrating a tread pattern 1 of a motorcycle tire (hereafter also referred to as "tire") according to Embodiment 1. The tire includes: a carcass toroidally crossing between bead portions; a belt located on the tire radial outer side of the carcass in the tread portion; and a tread rubber located on the tire radial outer side of the belt and forming a tread surface, although only partially illustrated.

In the tread surface, the region of less than 10% of the tread half width HW from the tire equatorial plane CL toward each of the tread edges E1 and E2 is referred to as "center region CR", the region of 10% or more and 45% or less of the tread half width HW from the tire equatorial plane CL toward each of the tread edges E1 and E2 as "middle region MR" (i.e. the region that is on the tire widthwise outer side of the center region CR and within 45% of the tread half width HW from the tire equatorial plane CL toward each of the tread edges E1 and E2), and the region of more than 45% of the tread half width HW from the tire equatorial plane CL toward each of the tread edges E1 and E2 as "shoulder region SR" (i.e. the region on the tire widthwise outer side of the middle region MR).

In other words, the two tread widthwise regions each of which is between the tread widthwise position away from the tire equatorial plane CL toward a different one of the tread edges E1 and E2 in the tread width direction by 10% of the tread half width HW and the tread widthwise position away from the tire equatorial plane CL toward the tread edge in the tread width direction by 45% of the tread half width HW (the region including the aforementioned tread widthwise positions) are each referred to as "middle region MR", the tread widthwise region on the tread widthwise inner side of the middle region MR is referred to as "center region CR", and the two tread widthwise regions each of which is on the tread widthwise outer side of the middle region MR are each referred to as "shoulder region SR".

As illustrated in FIG. 1, the tire according to Embodiment 1 includes, in the tread surface: a crossing groove 2 (2') crossing between the tread edges E1 and E2; and a non-crossing groove 3 (3') adjacent to the crossing groove 2 in the tire circumferential direction and extending from one tread edge E1 (E2) and not reaching the other tread edge E2 (E1).

Suppose the crossing groove 2 (2') and the non-crossing groove 3 (3') adjacent to the crossing groove 2 (2') in the tire circumferential direction constitute a groove group P (P') as a set. In the tire, the groove group P (P') is repeatedly provided in the tire circumferential direction so that adjacent groove groups are symmetric with respect to the tire equatorial plane CL, as illustrated in the drawing.

This is described in more detail below, with reference to FIGS. 1 and 3. The tire includes: a groove group P made up of a crossing groove 2 and a non-crossing groove 3 adjacent to the crossing groove 2 in the tire circumferential direction (toward the other side in the tire circumferential direction in the drawing) and extending from one tread edge E1 on the left side of the drawing and not reaching the other tread edge E2 on the right side of the drawing opposite to the one tread edge E1; and a groove group P' made up of another crossing groove 2' and a non-crossing groove 3' adjacent to the crossing groove 2' in the tire circumferential direction (toward the other side in the tire circumferential direction in the drawing) and extending from one tread edge E2 on the right side of the drawing and not reaching the other tread edge E1 on the left side of the drawing opposite to the one tread edge E2. In the tire, the groove groups P and P' respectively including the crossing grooves 2 and 2' and the non-crossing grooves 3 and 3' alternate in the tire circumferential direction so as to be bilaterally symmetric with respect to the tire equatorial plane CL in the drawing.

The following describes the crossing groove 2, the non-crossing groove 3, and the groove group P made up of the crossing groove 2 and the non-crossing groove 3 on the assumption that the tread edge E1 on the left side of the drawing is one tread edge and the tread edge E2 on the right side of the drawing is the other tread edge for simplicity's sake, unless otherwise noted. The same applies to the crossing groove 2', the non-crossing groove 3', and the groove group P' made up of the crossing groove 2' and the non-crossing groove 3', except that they are symmetric.

The crossing groove 2 has three bend portions, namely, a first bend portion B1, a second bend portion B2, and a third bend portion B3, in order from the one tread edge E1. In the illustrated example, the crossing groove 2 is made up of a plurality of linear groove portions. In detail, the crossing groove 2 has four groove portions delimited at the first bend portion B1 to the third bend portion B3, namely, a first groove portion G1 between the one tread edge E1 and the first bend portion B1, a second groove portion G2 between the first bend portion B1 and the second bend portion B2, a third groove portion G3 between the second bend portion B2 and the third bend portion B3, and a fourth groove portion G4 between the third bend portion B3 and the other tread edge E2 in order from the one tread edge E1.

The non-crossing groove 3 has a fifth groove portion G5 extending at least in the region between the one tread edge E1 and the position of 45% of the tread half width HW from the tire equatorial plane C1 toward the one tread edge E1. In the illustrated example, the non-crossing groove 3 is made up of a plurality of linear groove portions, as with the crossing groove 2. The non-crossing groove 3 has at least one bend portion including a fourth bend portion B4 located nearest the one tread edge E1, and at least two groove portions including the fifth groove portion G5 between the one tread edge E1 and the fourth bend portion B4. Although the end 31 (hereafter also referred to as "other end") of the non-crossing groove 3 on the other tread edge E2 side terminates within the land portion on the one tread edge E1 side of the tire equatorial plane CL and the groove portion between the other end 31 and the fourth bend portion B4 has no bend portion in the illustrated example, the other end 31 may be located at the crossing groove 2 (so that the non-crossing groove 3 communicates with the crossing groove 2) or may terminate across the crossing groove 2, or at least one bend portion (nth bend portion (n≥5)) other than the fourth bend portion B4 may be provided. Although the non-crossing groove 3 has a bend portion and a plurality of groove portions delimited at the bend portion in the illustrated example, the non-crossing groove 3 may be a groove with no bend portion, that is, a groove made up of only the fifth groove portion G5. The inclusion of a bend portion in the non-crossing groove 3 is not an essential feature in the disclosure.

In Embodiment 1, the crossing groove 2, the non-crossing groove 3, and the below-mentioned auxiliary groove 4 that may be provided may have a groove depth of 5 mm to 15 mm and a groove width of 3 mm to 15 mm.

In the tire, the crossing groove 2 has an inverted V shape centering at the second bend portion B2 located in the middle region MR on the one tread edge E1 side (i.e. nearer the one tread edge E1). At least the fifth groove portion G5 of the non-crossing groove 3, e.g. the entire non-crossing groove 3 in the illustrated example, is located in the land portion between the first groove portion G1 to third groove portion G3 of the crossing groove 2 in the groove group P and the third groove portion G3 and fourth groove portion G4 of the crossing groove 2' in the groove group P' adjacent to the groove group P toward the other side in the tire circumferential direction, and also extends toward the same side in the tire circumferential direction as the crossing grooves 2 and 2' in the direction from the one tread edge E1 to the other tread edge E2.

In detail, the first groove portion G1, the second groove portion G2, and the fifth groove portion G5 extend toward one side (the upper side in the drawing) in the tire circumferential direction and the third groove portion G3 and the fourth groove portion G4 extend toward the other side (the lower side in the drawing) in the tire circumferential direction, in the direction from the one tread edge E1 to the other tread edge E2. Although the groove portion between the fourth bend portion B4 and other end 31 of the non-crossing groove 3 extends toward the one side in the tire circumferential direction in the direction from the one tread edge E1 to the other tread edge E2 in the illustrated example, the groove portion may extend in any direction.

Figure 2:
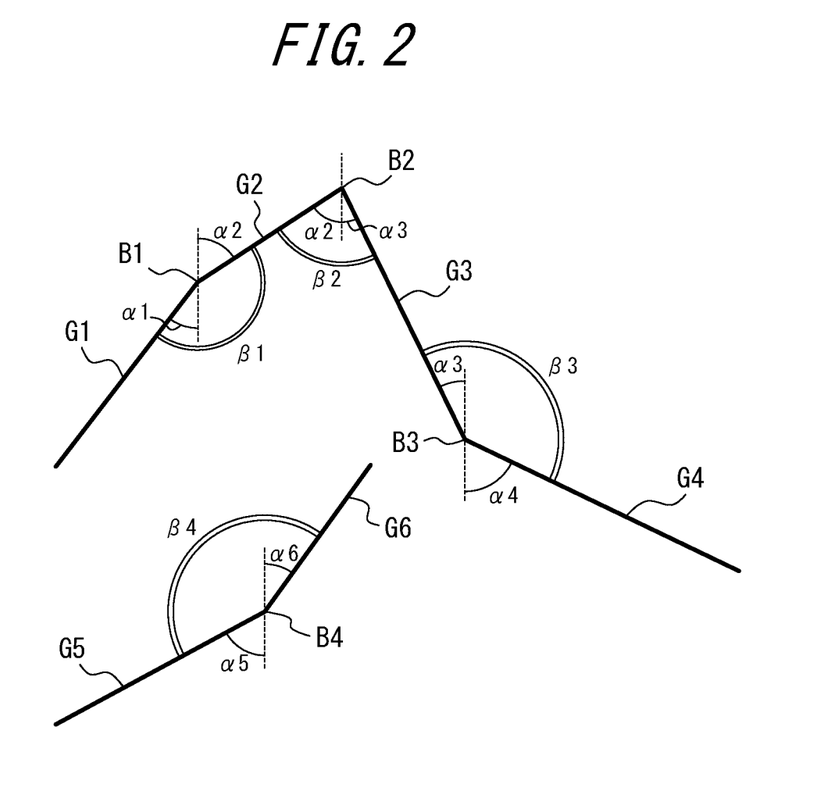
FIG. 2 is a simplified view of one groove group in the tread pattern of the tire in FIG. 1.

As illustrated in FIG. 1 and a simplified view of one groove group in FIG. 2, the respective inclination angles $\alpha 2$, $\alpha 4$, and $\alpha 5$ of the second groove portion G2 and fourth groove portion G4 of the crossing groove 2 and the fifth groove portion G5 of the non-crossing groove 3 with respect to the tire circumferential direction are each larger than the inclination angle $\alpha 1$ of the first groove portion G1 of the crossing groove 2 with respect to the tire circumferential direction. In FIG. 2, each line segment indicates the groove width centerline of the corresponding groove, and each dashed line indicates a line segment parallel to the tire circumferential direction. In the disclosure, the inclination angle $\beta$ of each groove portion with respect to the tire circumferential direction is the smaller one of the angles.

The first bend portion B1 is located in the shoulder region SR on the one tread edge E1 side, the second bend portion B2 and the fourth bend portion B4 are located in the middle region MR on the one tread edge E1 side, and the third bend portion B3 is located in the middle region MR on the other tread edge E2 side (i.e. nearer the other tread edge E2). In other words, the first groove portion G1 is located in the shoulder region SR, each of the fourth groove portion G4 and the fifth groove portion G5 has at least a portion located in the shoulder region SR, the third groove portion G3 has at least a portion located in the center region CR, and the second groove portion G2 is located in the middle region MR to the shoulder region SR.

As illustrated in the drawing, in Embodiment 1, an auxiliary groove 4 terminating within the land portion at both ends may be further provided on the extended line of the non-crossing groove 3 of the groove group P, between the crossing groove 2 of the groove group P and the non-crossing groove 3' of the adjacent groove group P' which is adjacent to the groove group P.

The following describes the working effects of the tire in Embodiment 1.

The surface of the tread portion of a motorcycle tire is significantly curved in a convex arc shape in its tire widthwise cross section. Accordingly, the center region CR is mainly in contact with the road surface during straight running, whereas the middle region MR or the shoulder region SR on the tire widthwise outer side of the center region CR is in contact with the road surface during cornering when the motorcycle is leaned to make turns. We looked at this difference in the portion of the tread surface coming into contact with the road surface between straight running and cornering, and devised such a tread pattern suitable for each running situation, to enhance both of the steering stability and drainage performance of the tire.

In detail, as illustrated in FIG. 1, the first groove portion G1 with a relatively small inclination angle with respect to the tire circumferential direction and the fourth groove portion G4 and the fifth groove portion G5 with a relatively large inclination angle with respect to the tire circumferential direction are located in each shoulder region SR of the tread surface. During cornering, the first groove portion G1 with a relatively small inclination angle ensures drainage performance, while the land portion adjacent to each of the fourth groove portion G4 and fifth groove portion G5 with a relatively large inclination angle has high tire widthwise rigidity. Drainage performance and steering stability during cornering can both be achieved in this way.

Regarding the third groove portion G3, in the case where the third groove portion G3 has a small inclination angle, especially the tire circumferential rigidity of the center region CR is high, with it being possible to improve steering stability and drainage performance during straight running. In the case where the third groove portion G3 has a large inclination angle, the tire widthwise rigidity of the center region CR is high, with it being possible to improve steering stability during cornering.

Moreover, by arranging the bend portions B1 to B4 from the center region CR to the shoulder region SR, the groove portions G1 to G5 that differ in inclination angle from each other are situated in the regions within the ground-contact surface. This delivers stable running performance against input of force from various directions to the tire in various running situations.

The tire according to this embodiment thus has enhanced steering stability and drainage performance.

In the tire in Embodiment 1, the first groove portion G1, the second groove portion G2, and the fifth groove portion G5 extend toward the one side in the tire circumferential direction and the third groove portion G3 and the fourth groove portion G4 extend toward the other side in the tire circumferential direction, in the direction from the one tread edge E1 to the other tread edge E2. Hence, both steering stability and drainage performance can be achieved effectively as compared with, for example, the case where the groove portions extend only toward the one side or toward the other side in the tire circumferential direction.

Moreover, since the crossing groove 2 has the three bend portions B1 to B3, stable running performance can be delivered against input of force from various directions. In addition, a decrease in land portion rigidity around bend portions, which may be caused by the presence of too many bend portions, and a resulting decrease in wear resistance and the like can be prevented.

Furthermore, when the non-crossing groove 3 has at least one bend portion including the fourth bend portion, stable running performance can be delivered against input of force from various directions.

In the tire in Embodiment 1, preferably, the bend portion angle $\beta 2$ of the second bend portion B2 is smallest of the respective bend portion angles $\beta 1$ to $\beta 4$ of the first bend portion B1 to fourth bend portion B4, as illustrated in FIGS. 1 and 2. When the bend portion angle $\beta 2$ of the second bend portion B2 is smallest, both drainage performance and steering stability can be enhanced more efficiently. In detail, in the arrangement where the crossing groove 2 has an inverted V shape centering at the second bend portion B2 and the non-crossing groove 3 is located between the adjacent crossing grooves 2 and 2', when the bend portion angle $\beta 2$ of the second bend portion B2 located in the middle region MR in the crossing groove 2 is smallest, both steering stability and drainage performance can be enhanced more efficiently than when the bend portion angle of another bend portion is smaller. Here, each bend portion angle $\alpha$ is the smaller one of the angles formed between the respective centerlines that pass through the groove width centers of the two groove portions adjacent to the corresponding bend portion and extend to the bend portion.

Although the first bend portion B1 may be at any position as long as it is located in the shoulder region SR, the first bend portion B1 is preferably located in the region of 50% or more and 65% or less of the tread half width HW from the tire equatorial plane CL toward the tread edge E1 or E2, in the shoulder region SR. This enhances both drainage performance and steering stability more efficiently. In detail, the first groove portion G1 with a relatively small inclination angle with respect to the tire circumferential direction contributes to higher drainage performance, and higher tire widthwise rigidity of the land portion adjacent to the second groove portion G2 with a relatively large inclination angle with respect to the tire circumferential direction contributes to higher steering stability.

In the tire in Embodiment 1, the inclination angle α3 of the third groove portion G3 with respect to the tire circumferential direction is smaller than the inclination angle α1 of the first groove portion G1 with respect to the tire circumferential direction, that is, the inclination angle α3 of the third groove portion G3 with respect to the tire circumferential direction is smallest of the first groove portion G1 to the fifth groove portion G5, as illustrated in FIGS. 1 and 2. Such small inclination angle α3 of the third groove portion G3 contributes to higher tire circumferential rigidity of the center region CR, so that steering stability during straight running when the center region CR is mainly in contact with the road surface can be further improved.

In the case where the inclination angle α3 of the third groove portion G3 with respect to the tire circumferential direction is smaller than the inclination angle α1 of the first groove portion G1 with respect to the tire circumferential direction, preferably, the inclination angle α1 of the first groove portion G1 with respect to the tire circumferential direction is in the range of 30° to 45° and the inclination angle α3 of the third groove portion G3 with respect to the tire circumferential direction is in the range of 15° to 32°. This improves drainage performance and steering stability more effectively. In detail, when the inclination angle α1 of the first groove portion G1 is 30° or more, tire widthwise rigidity can be maintained. When the inclination angle α1 is 45° or less, drainage performance can be improved. When the inclination angle α3 of the third groove portion G3 is 15° or more, tire widthwise rigidity near the tire equatorial plane can be ensured, as a result of which wobbling which may occur during straight running with a slight camber angle is prevented to improve steering stability during straight running. When the inclination angle α3 is 32° or less, tire circumferential rigidity can be ensured to improve drainage performance and steering stability during straight running.

From the same perspective, preferably, the inclination angle α2 of the second groove portion G2 is in the range of 50° to 60°, the inclination angle α4 of the fourth groove portion G4 is in the range of 55° to 70°, and the inclination angle α5 of the fifth groove portion G5 is in the range of 55° to 70°.

Although the non-crossing groove 3 may have at least one bend portion (nth bend portion (n≥5)) between the fourth bend portion B4 and the other end 31, the non-crossing groove 3 preferably has only one bend portion (fourth bend portion B4) as illustrated in FIG. 1. In this case, the inclination angle α6 of the sixth groove portion G6 with respect to the tire circumferential direction is preferably in the range of 15° to 40°, in terms of drainage performance during straight running.

Moreover, the extended line of the sixth groove portion G6 of the non-crossing groove 3 preferably intersects with the third groove portion G3 of the crossing groove 2, as illustrated in FIG. 1. The sixth groove portion G6 is then distant from the groove portions of the crossing grooves 2 and 2', so that the groove portions are distributed in the tread surface. This enables the tread to bend and deform favorably, and thus improves grounding property during straight running. In this case, the other end 31 of the non-crossing groove 3 is preferably not open to the third groove portion G3, as illustrated in FIG. 1. Since the third groove portion G3 has a relatively small inclination angle with respect to the tire circumferential direction, if the other end 31 is open to the third groove portion G3, the formed corner has a small intersection angle, which can cause a decrease in wear resistance.

In the tire, at least the crossing groove 2 and non-crossing groove 3 of the groove group P and the crossing groove 2' of the adjacent groove group P' are preferably included within the range of the tire circumferential length of the ground-contact surface. Thus, sufficient steering stability and drainage performance can be exhibited during running.

In the tire, the spacing between the crossing groove 2 and non-crossing groove 3 of the groove group P, the spacing between the crossing groove 2 of the groove group P and the crossing groove 2' of the adjacent groove group P', and the spacing between the non-crossing groove 3 of the groove group P and the crossing groove 2' of the adjacent groove group P' at the one tread edge E1 are preferably in the ranges of 40% to 65%, 50% to 70%, and 50% to 75% of the tread half width HW, respectively. If the spacing between the grooves is narrow, rigidity decreases, which can cause, for example, lower performance or feeling during braking or acceleration. If the spacing between the grooves is wide, the amount of grooves within the ground-contact surface decreases, which can cause lower drainage performance.

The second bend portion B2 and fourth bend portion B4 of the groove group P and the third bend portion B3 of the adjacent groove group P' preferably do not overlap each other in the tire circumferential direction. This contributes to higher steering stability against input of force from various directions to the tire.

In the tire in Embodiment 1, preferably, the auxiliary groove 4 terminating within the land portion at both ends is further provided on the extended line of the non-crossing groove 3 of the groove group P between the crossing groove 2 of the groove group P and the non-crossing groove 3' of the adjacent groove group P', as mentioned earlier. In this way, a large block-shaped portion surrounded by the crossing groove 2 of the groove group P, the non-crossing groove 3' of the adjacent groove group P', and the fourth groove portion G4 of the crossing groove 2' of the adjacent groove group P' is defined by the auxiliary groove 4, as illustrated in FIG. 1. The land portion can thus be provided with appropriate rigidity, which improves steering stability. In detail, for example if the extended line of the sixth groove portion G6 of the non-crossing groove 3 intersects with the third groove portion G3 of the crossing groove 2, the block-shaped portion defined by the auxiliary groove 4 approaches the rigidity of the block-shaped portion surrounded by the crossing groove 2 and non-crossing groove 3 of the groove group P. The block-shaped portions are thus uniformized in rigidity, which improves grounding property and steering stability. Here, since the auxiliary groove 4 terminates within the land portion without communicating with any other groove, no corner of the land portion is formed, so that favorable wear resistance is maintained.

In the tire in Embodiment 1, preferably, at each of the openings of the first groove portion G1, fourth groove portion G4, and fifth groove portion G5 to the tread edge E1 or E2, the land portion adjacent to the groove portion is chamfered to increase the groove width of the groove portion. Such chamfering of the land portion prevents the block end from chipping.

Preferably, the tire in Embodiment 1 is a rear tire of a motorcycle, and rotates in the direction from the other side (the lower side in FIG. 1) in the tire circumferential direction to the one side (the upper side in FIG. 1) in the tire circumferential direction, as illustrated in FIG. 1. A rear tire of a motorcycle is a drive wheel, and so is especially required to have tire circumferential rigidity during straight running. The tire in Embodiment 1 has improved tire circumferential rigidity by a small inclination angle of the third groove portion G3 with respect to the tire circumferential direction as mentioned above, and therefore can be suitably used as a rear tire. Moreover, since the rotation direction of the tire is from the other side in the tire circumferential direction to the one side in the tire circumferential direction, the tire comes into contact with the road surface from the second bend portion B2 side in the crossing groove 2. This allows water to flow outward in the tire width direction, in the center region CR that comes into contact with the road surface during straight running. Hence, favorable drainage performance during straight running can be ensured.

Figure 3:
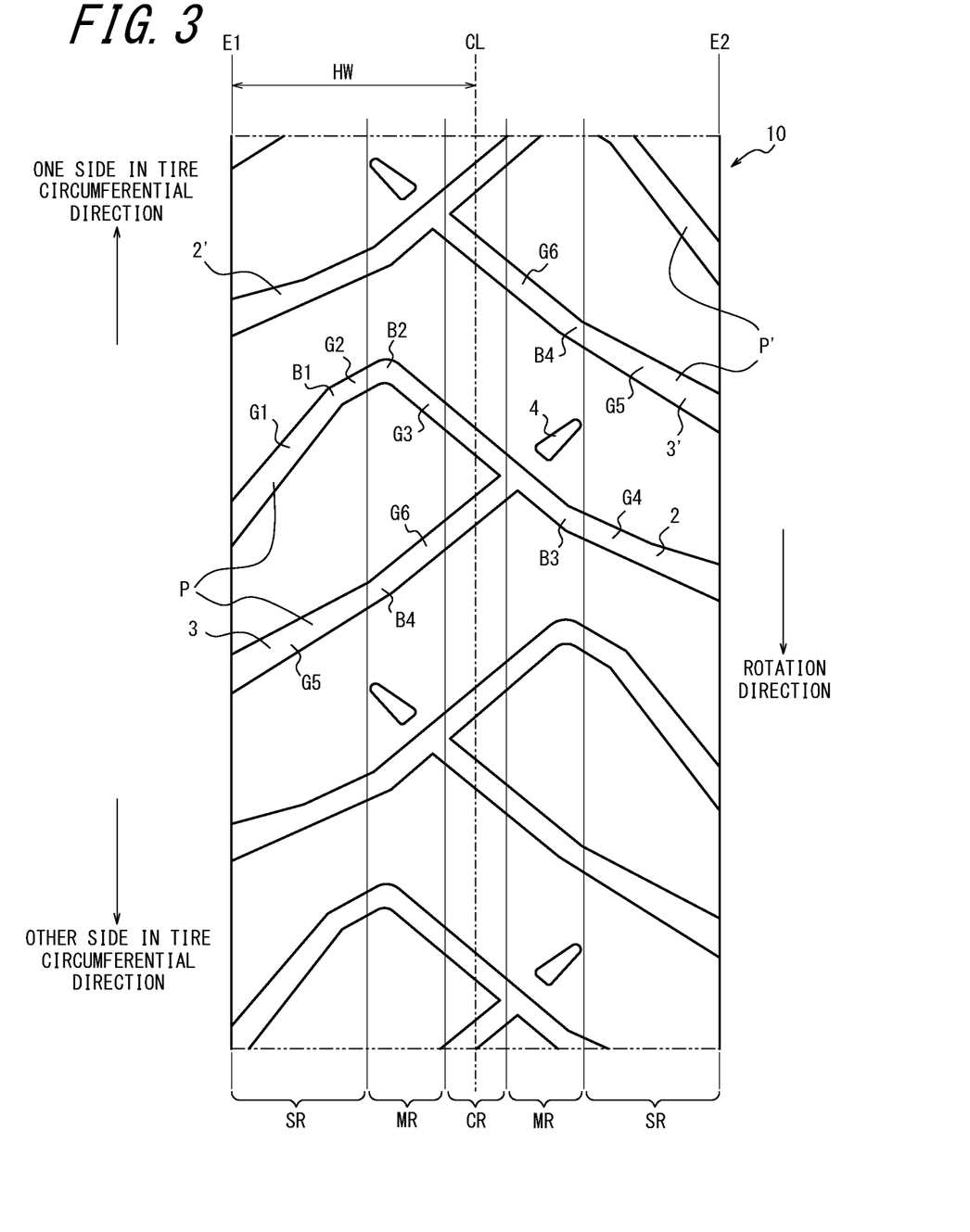
FIG. 3 is a developed view illustrating a tread pattern of a motorcycle tire according to Embodiment 2.

The following describes a motorcycle tire according to Embodiment 2 by focusing on the differences from the tire according to Embodiment 1, with reference to FIG. 3.

FIG. 3 is a developed view illustrating a tread pattern 10 of a motorcycle tire according to Embodiment 2. The same components as those in Embodiment 1 are given the same reference signs, and their description is omitted.

In the tire in Embodiment 2, the inclination angle $\alpha 3$ of the third groove portion G3 with respect to the tire circumferential direction is larger than the inclination angle $\alpha 1$ of the first groove portion G1 with respect to the tire circumferential direction. A larger inclination angle $\alpha 3$ of the third groove portion G3 than the inclination angle $\alpha 1$ of the first groove portion G1 contributes to relatively high tire widthwise rigidity of the center region CR, thus improving steering stability during cornering.

In Embodiment 2, preferably, the inclination angle $\alpha 1$ of the first groove portion G1 with respect to the tire circumferential direction is in the range of 35° to 45°, and the inclination angle $\alpha 3$ of the third groove portion G3 with respect to the tire circumferential direction is in the range of 45° to 55°. This improves drainage performance and steering stability more effectively. In detail, when the inclination angle $\alpha 1$ of the first groove portion G1 is in the aforementioned range, drainage performance can be improved while maintaining tire widthwise rigidity more favorably. When the inclination angle $\alpha 3$ of the third groove portion G3 is in the aforementioned range, tire widthwise rigidity can be improved to improve steering stability during cornering while ensuring steering stability during straight running.

From the same perspective, preferably, the inclination angle $\alpha 2$ of the second groove portion G2 is in the range of 55° to 65°, the inclination angle $\alpha 4$ of the fourth groove portion G4 is in the range of 60° to 70°, and the inclination angle $\alpha 5$ of the fifth groove portion G5 is in the range of 60° to 70°.

Although the non-crossing groove 3 may have at least one bend portion (nth bend portion (n≥5)) between the fourth bend portion B4 and the other end 31 in Embodiment 2 illustrated in FIG. 3 as in the embodiment illustrated in FIG. 1, the non-crossing groove 3 preferably has only one bend portion (fourth bend portion B4) as illustrated in FIG. 3. In this case, in Embodiment 2, the inclination angle $\alpha 6$ of the sixth groove portion G6 between the fourth bend portion B4 and the other end 31 with respect to the tire circumferential direction is preferably in the range of 34° to 44°, in terms of steering stability during straight running.

Moreover, the other end 31 of the non-crossing groove 3 is preferably open to the third groove portion G3 in terms of grounding property during straight running, as illustrated in FIG. 3. Since the third groove portion G3 has a relatively large inclination angle with respect to the tire circumferential direction, even when the other end 31 is open to the third groove portion G3, the formed corner does not have a small intersection angle, and the possibility of a decrease in drainage performance as a result of the third groove portion G3 having a relatively large inclination angle with respect to the tire circumferential direction can be reduced.

Preferably, the tire in Embodiment 2 is a front tire of a motorcycle, and rotates in the direction from the one side (the upper side in FIG. 3) in the tire circumferential direction to the other side (the lower side in FIG. 3) in the tire circumferential direction, as illustrated in FIG. 3. A front tire of a motorcycle turns first during cornering, and so is especially required to have tire widthwise rigidity in the center region CR during cornering. The tire in Embodiment 2 has improved tire widthwise rigidity by a large inclination angle of the third groove portion G3 with respect to the tire circumferential direction as mentioned above, and therefore can be suitably used as a front tire. Moreover, since the rotation direction of the tire is from the one side in the tire circumferential direction to the other side in the tire circumferential direction, during cornering the first groove portion G1, the fourth groove portion G4, and the fifth groove portion G5 come into contact with the road surface while inclining to the one side in the tire circumferential direction in the direction from the tread edge E1 or E2 to the tire widthwise inner side. This allows water to flow in the opposite direction to the traveling direction of the vehicle during cornering. Hence, favorable drainage performance during cornering can be ensured.

A tire set according to Embodiment 1 includes the tire in Embodiment 1 illustrated in FIG. 1 as a rear tire of a motorcycle and the tire in Embodiment 2 illustrated in FIG. 3 as a front tire of a motorcycle, as a set to be mounted on the same motorcycle. The use of these tires as a set achieves sufficient drainage performance and steering stability with favorable balance.

While some of the disclosed embodiments have been described above with reference to drawings, the motorcycle tire and tire set according to the disclosure are not limited to the foregoing embodiments, and changes may be made as appropriate.

EXAMPLES

The disclosed techniques are described in more detail below using prophetic examples, although the disclosure is not limited to these examples.

Examples 1 to 3

A tire of Example 1 is a rear tire of a motorcycle with tire size 140/80R17, and rotates in the direction from the other side in the tire circumferential direction to the one side in the tire circumferential direction as illustrated in FIG. 1. In the tire of Example 1, the first groove portion, the second groove portion, the fifth groove portion, and the sixth groove portion extend toward the one side in the tire circumferential direction and the third groove portion and the fourth groove portion extend toward the other side in the tire circumferential direction, in the direction from the one tread edge E1 to the other tread edge E2. Moreover, the bend portion angle $\beta 2$ of the second bend portion is smallest of the bend portion angles $\beta 1$ to $\beta 4$ of the first bend portion to fourth bend portion. In the tire of Example 1, the other end of the sixth groove portion terminates within the land portion, and the land portion is chamfered at each of the openings of the first groove portion, fourth groove portion, and fifth groove portion to the tread edge E1 or E2. The tire of Example 1 has the structure (the tire widthwise positions of the respective bend portions, the bend portion angles β1 to β4 of the respective bend portions, and the inclination angles α1 to α6 of the respective groove portions) shown in Table 1.

A tire of Example 2 is the same as the tire of Example 1, except that the magnitude relationship between the inclination angles α1 and α3 of the first groove portion and third groove portion is reversed from that of the tire of Example 1 and the positions and bend portion angles of the bend portions are adjusted accordingly.

A tire of Example 3 is the same as the tire of Example 1, except that the auxiliary groove is further provided.

Examples 4 to 6

A tire of Example 4 is a front tire of a motorcycle with tire size 110/80R19, and rotates in the direction from the one side in the tire circumferential direction to the other side in the tire circumferential direction as illustrated in FIG. 3. In the tire of Example 4, the first groove portion, the second groove portion, the fifth groove portion, and the sixth groove portion extend toward the one side in the tire circumferential direction and the third groove portion and the fourth groove portion extend toward the other side in the tire circumferential direction, in the direction from the one tread edge E1 to the other tread edge E2. Moreover, the bend portion angle β2 of the second bend portion is smallest of the bend portion angles β1 to β4 of the first bend portion to fourth bend portion. In the tire of Example 4, the other end of the sixth groove portion is open to the third groove portion, and the land portion is chamfered at each of the openings of the first groove portion, fourth groove portion, and fifth groove portion to the tread edge E1 or E2. The tire of Example 4 has the structure (the tire widthwise positions of the respective bend portions, the bend portion angles β1 to β4 of the respective bend portions, and the inclination angles α1 to α6 of the respective groove portions) shown in Table 1.

A tire of Example 5 is the same as the tire of Example 4, except that the magnitude relationship between the inclination angles α1 and α3 of the first groove portion and third groove portion is reversed from that of the tire of Example 4 and the positions and bend portion angles of the bend portions are adjusted accordingly.

A tire of Example 6 is the same as the tire of Example 4, except that the auxiliary groove is further provided.

Comparative Example 1

A tire of Comparative Example 1 is the same as the tire of Example 1, except that the inclination angles of the first groove portion, second groove portion, fourth groove portion, and fifth groove portion are the same and the positions and bend portion angles of the bend portions are adjusted accordingly as shown in Table 1. Since the first groove portion and the second groove portion have the same inclination angle, the first bend portion has no bend.

Comparative Example 2

A tire of Comparative Example 2 is the same as the tire of Example 4, except that the inclination angles of the first groove portion, second groove portion, fourth groove portion, and fifth groove portion are the same and the positions of the bend portions are adjusted accordingly as shown in Table 1. Since the first groove portion and the second groove portion have the same inclination angle, the first bend portion has no bend.

The steering stability and drainage performance of each of the tires of the examples and comparative examples are evaluated by the following methods.

As a tire set to be mounted on a vehicle, each of the following is used: Example tire sets 1 to 3 made up of respectively the tires of Examples 1 to 3 as a rear tire and the tire of Comparative Example 2 as a front tire; Example tire sets 4 to 6 made up of respectively the tires of Examples 4 to 6 as a front tire and the tire of Comparative Example 1 as a rear tire; Example tire set 7 made up of the tire of Example 3 as a rear tire and the tire of Example 6 as a front tire; and Comparative Example tire set 1 made up of the tire of Comparative Example 1 as a rear tire and the tire of Comparative Example 2 as a front tire.

(Steering Stability)

The rear tire of each tire set is attached to a rim with size 140/80R17, and the front tire is attached to a rim with size 110/80R19. Each tire is set to tire internal pressure of 230 kPa, and to be mounted on a motorcycle (1200 cc). Steering stability during cornering (a cornering path of 50 m in radius) and during straight running is evaluated from the feeling result (actual vehicle evaluation result) of a test rider on a test course. The evaluation results are shown in Table 2. The numerical value of steering stability is represented by an index with the result of Comparative Example tire set 1 being set to 100, where a larger numerical value indicates higher steering stability.

(Drainage Performance)

Each tire set is to be mounted on a motorcycle in the same way as in the evaluation of steering stability. A test rider runs the motorcycle on a straight path and cornering path (50 m in radius) of a test course sprinkled with water to a water depth of 4 mm, and braking distance when braking from 80 km/h on the straight path and 50 km/h on the cornering path is measured. The measurement results are shown in Table 2. The numerical value of drainage performance during each of straight running and cornering is represented by an index with the result of Comparative Example tire set 1 being set to 100, using the inverse of the measurement result. A larger numerical value indicates higher drainage performance.

TABLE 1

| | | Example 1 | Example 2 | Example 3 | Example 4 | Example 5 | Example 6 | Comparative Example 1 | Comparative Example 2 |
|---|---|---|---|---|---|---|---|---|---|
| | Tire | For Rear | For Rear | For Rear | For Front | For Front | For Front | For Rear | For Front |
| Tire widthwise position of bend portion | First bend portion | 58/SR/One | 58/SR/One | 58/SR/One | 58/SR/One | 58/SR/One | 58/SR/One | — | — |
| | Second bend portion | 18/MR/One | 18/MR/One | 18/MR/One | 35/MR/One | 35/MR/One | 35/MR/One | 18/MR/One | 35/MR/One |
| | Third bend portion | 17/MR/Other | 17/MR/Other | 17/MR/Other | 36/MR/Other | 36/MR/Other | 36/MR/Other | 20/MR/Other | 37/MR/Other |
| | Fourth bend portion | 39/MR/One | 39/MR/One | 39/MR/One | 34/MR/One | 34/MR/One | 34/MR/One | 39/MR/One | 36/MR/One |

TABLE 1-continued

|  |  | Example 1 | Example 2 | Example 3 | Example 4 | Example 5 | Example 6 | Comparative Example 1 | Comparative Example 2 |
|---|---|---|---|---|---|---|---|---|---|
| Bend portion angle of bend portion | $\beta1(°)$ | 160 | 153 | 160 | 160 | 165 | 160 | 180 | 180 |
| | $\beta2(°)$ | 84 | 92 | 84 | 110 | 102 | 110 | 74 | 85 |
| | $\beta3(°)$ | 144 | 152 | 144 | 165 | 157 | 165 | 154 | 175 |
| | $\beta4(°)$ | 152 | 152 | 152 | 154 | 154 | 154 | 166 | 167 |
| Inclination angle of groove portion | $\alpha1(°)$ | 37 | 30 | 37 | 40 | 45 | 40 | 50 | 45 |
| | $\alpha2(°)$ | 57 | 57 | 57 | 60 | 60 | 60 | 50 | 45 |
| | $\alpha3(°)$ | 27 | 35 | 27 | 50 | 42 | 50 | 24 | 40 |
| | $\alpha4(°)$ | 63 | 63 | 63 | 65 | 65 | 65 | 50 | 45 |
| | $\alpha5(°)$ | 64 | 64 | 64 | 64 | 64 | 64 | 50 | 45 |
| | $\alpha6(°)$ | 36 | 36 | 36 | 38 | 38 | 38 | 36 | 32 |
| Auxiliary groove | | Not provided | Not provided | Provided | Not provided | Not provided | Provided | Not provided | Not provided |

\* The position of each bend portion is expressed by the ratio (%) to the tread half width from the tire equatorial plane, together with the center region (CR), the middle region (MR), or the shoulder region (SR).
In the table, "One" indicates the position is on the one ground contact edge E1 side, and "Other" indicates the position is on the other ground contact edge E2 side.

TABLE 2

|  |  | Comparative Example tire set 1 | Example tire set 1 | Example tire set 2 | Example tire set 3 | Example tire set 4 | Example tire set 5 | Example tire set 6 | Example tire set 7 |
|---|---|---|---|---|---|---|---|---|---|
| Tire for Rear | | Tire of Comparative Example 1 | Tire of Example 1 | Tire of Example 2 | Tire of Example 3 | Tire of Comparative Example 1 | Tire of Comparative Example 1 | Tire of Comparative Example 1 | Tire of Example 3 |
| Tire for Front | | Tire of Comparative Example 2 | Tire of Comparative Example 2 | Tire of Comparative Example 2 | Tire of Comparative Example 2 | Tire of Example 4 | Tire of Example 5 | Tire of Example 6 | Tire of Example 6 |
| Steering stability | During cornering | 100 | 108 | 108 | 108 | 110 | 110 | 110 | 115 |
| | During straight running | 100 | 110 | 108 | 112 | 107 | 110 | 112 | 112 |
| Drainage performance | During cornering | 100 | 110 | 108 | 110 | 105 | 105 | 105 | 115 |
| | During straight running | 100 | 115 | 110 | 115 | 110 | 113 | 110 | 117 |

Table 2 demonstrates the following. In Example tire sets 1 to 7, the inclination angles $\alpha2$, $\alpha4$, and $\alpha5$ of the respective second groove portion, fourth groove portion, and fifth groove portion in the rear tire and/or the front tire are each larger than the inclination angle $\alpha1$ of the first groove portion, and so both steering stability and drainage performance are higher than those of Comparative Example tire set 1 in which the inclination angles $\alpha1$, $\alpha2$, $\alpha4$, and $\alpha5$ of the respective first groove portion, second groove portion, fourth groove portion, and fifth groove portion in the rear tire and the front tire are the same.

In Example tire set 1, the inclination angle $\alpha3$ of the third groove portion is smaller than the inclination angle $\alpha1$ of the first groove portion, and so steering stability during straight running is higher than that of Example tire set 2 in which the inclination angle $\alpha3$ of the third groove portion is larger than the inclination angle $\alpha1$ of the first groove portion.

In Example tire sets 3 and 6, the auxiliary groove is provided, and so steering stability is higher than that of Example tire sets 1, 2, 4, and 5 without the auxiliary groove.

In Example tire set 7, both the rear tire and the front tire are Example tires, and so both steering stability and drainage performance are higher than those of Example tire sets 1 to 6.

INDUSTRIAL APPLICABILITY

It is thus possible to provide a motorcycle tire and tire set having both high steering stability and high drainage performance.

REFERENCE SIGNS LIST 1, 10 tread pattern
2, 2' crossing groove
3, 3' non-crossing groove
31 other end
4 auxiliary groove
CL tire equatorial plane
HW tread half width
CR center region
MR middle region
SR shoulder region
E1 one tread edge
E2 other tread edge
B1 to B4 first bend portion to fourth bend portion
G1 to G6 first groove portion to sixth groove portion
P, P' groove group
$\alpha1$ to $\alpha6$ inclination angles of first groove portion to sixth groove portion with respect to tire circumferential direction β1 to β4 bend portion angles of first bend portion to fourth bend portion

The invention claimed is:

1. A motorcycle tire comprising:
a crossing groove crossing between tread edges; and
a non-crossing groove adjacent to the crossing groove in a tire circumferential direction, and extending from one tread edge and not reaching an other tread edge,
wherein the crossing groove has three bend portions, which are a first bend portion to a third bend portion in order from the one tread edge, and has four groove portions, which are a first groove portion, between the one tread edge and the first bend portion, to a fourth groove portion, between the third bend portion and the other tread edge, in order from the one tread edge, the first groove portion to the fourth groove portion being delimited at the first bend portion to the third bend portion,
the non-crossing groove has a fifth groove portion extending at least in a region between the one tread edge and a position of 45% of a tread half width from a tire equatorial plane toward the one tread edge,
the first groove portion, the second groove portion, and the fifth groove portion extend toward one side in the tire circumferential direction and the third groove portion and the fourth groove portion extend toward an other side in the tire circumferential direction, in a direction from the one tread edge to the other tread edge,
a groove group made up of the crossing groove and the non-crossing groove adjacent to the crossing groove in the tire circumferential direction as a set is repeatedly provided in the tire circumferential direction so that adjacent groove groups are symmetric with respect to the tire equatorial plane,
when, in a tread surface, a region of less than 10% of the tread half width from the tire equatorial plane toward each of the tread edges is referred to as a center region, a region of 10% or more and 45% or less of the tread half width from the tire equatorial plane toward each of the tread edges is referred to as a middle region, and a region of more than 45% of the tread half width from the tire equatorial plane toward each of the tread edges is referred to as a shoulder region,
the first bend portion is located in the shoulder region nearer the one tread edge,
the second bend portion is located in the middle region nearer the one tread edge,
the third bend portion is located in the middle region nearer the other tread edge, and
respective inclination angles of the second groove portion, the fourth groove portion, and the fifth groove portion with respect to the tire circumferential direction are each larger than an inclination angle of the first groove portion with respect to the tire circumferential direction.

2. The motorcycle tire according to claim 1,
wherein the non-crossing groove has at least one bend portion including a fourth bend portion that is nearest the one tread edge and is located in the middle region nearer the one tread edge, and
the fifth groove portion extends in a region between the one tread edge and the fourth bend portion.

3. The motorcycle tire according to claim 2,
wherein a bend portion angle of the second bend portion is smallest of respective bend portion angles of the first bend portion to the fourth bend portion.

4. The motorcycle tire according to claim 1,
wherein the first bend portion is located in a region of 50% or more and 65% or less of the tread half width from the tire equatorial plane toward the tread edge.

5. The motorcycle tire according to claim 1,
wherein an auxiliary groove terminating within a land portion at both ends is provided on an extended line of the non-crossing groove of one of the groove groups, between the crossing groove of the one of the groove groups and the non-crossing groove of an adjacent groove group adjacent to the one of the groove groups.

6. The motorcycle tire according to claim 1,
wherein an inclination angle of the third groove portion with respect to the tire circumferential direction is smaller than the inclination angle of the first groove portion with respect to the tire circumferential direction.

7. The motorcycle tire according to claim 6,
wherein the inclination angle of the first groove portion with respect to the tire circumferential direction is in a range of 30° to 45°, and
the inclination angle of the third groove portion with respect to the tire circumferential direction is in a range of 15° to 32°.

8. The motorcycle tire according to claim 6,
wherein at each of respective openings of the first groove portion, the fourth groove portion, and the fifth groove portion to the tread edge, a land portion adjacent to the respective groove portion is chamfered to increase a groove width of the respective groove portion.

9. The motorcycle tire according to claim 1,
wherein the motor cycle tire is for use as a rear tire of a motorcycle, and a rotation direction of the motor cycle tire is a direction from the other side in the tire circumferential direction to the one side in the tire circumferential direction.

10. The motorcycle tire according to claim 1,
wherein an inclination angle of the third groove portion with respect to the tire circumferential direction is larger than the inclination angle of the first groove portion with respect to the tire circumferential direction.

11. The motorcycle tire according to claim 10,
wherein the inclination angle of the first groove portion with respect to the tire circumferential direction is in a range of 35° to 45°, and
the inclination angle of the third groove portion with respect to the tire circumferential direction is in a range of 45° to 55°.

12. The motorcycle tire according to claim 10,
wherein at each of respective openings of the first groove portion, the fourth groove portion, and the fifth groove portion to the tread edge, a land portion adjacent to the respective groove portion is chamfered to increase a groove width of the respective groove portion.

13. The motorcycle tire according to claim 1,
wherein the motorcycle tire is for use as a front tire of a motorcycle, and a rotation direction of the motorcycle tire is a direction from the one side in the tire circumferential direction to the other side in the tire circumferential direction.

14. A tire set comprising, as a set, a rear tire and a front tire, said front and said rear tires each comprising:
a crossing groove crossing between tread edges; and
a non-crossing groove adjacent to the crossing groove in a tire circumferential direction, and extending from one tread edge and not reaching an other tread edge, wherein the crossing groove has three bend portions, which are a first bend portion to a third bend portion in order from the one tread edge, and has four groove portions, which are a first groove portion, between the one tread edge and the first bend portion, to a fourth groove portion, between the third bend portion and the other tread edge, in order from the one tread edge, the first groove portion to the fourth groove portion being delimited at the first bend portion to the third bend portion, the non-crossing groove has a fifth groove portion extending at least in a region between the one tread edge and a position of 45% of a tread half width from a tire equatorial plane toward the one tread edge, the first groove portion, the second groove portion, and the fifth groove portion extend toward one side in the tire circumferential direction and the third groove portion and the fourth groove portion extend toward an other side in the tire circumferential direction, in a direction from the one tread edge to the other tread edge, a groove group made up of the crossing groove and the non-crossing groove adjacent to the crossing groove in the tire circumferential direction as a set is repeatedly provided in the tire circumferential direction so that adjacent groove groups are symmetric with respect to the tire equatorial plane, when, in a tread surface, a region of less than 10% of the tread half width from the tire equatorial plane toward each of the tread edges is referred to as a center region, a region of 10% or more and 45% or less of the tread half width from the tire equatorial plane toward each of the tread edges is referred to as a middle region, and a region of more than 45% of the tread half width from the tire equatorial plane toward each of the tread edges is referred to as a shoulder region, the first bend portion is located in the shoulder region nearer the one tread edge, the second bend portion is located in the middle region nearer the one tread edge, the third bend portion is located in the middle region nearer the other tread edge, and respective inclination angles of the second groove portion, the fourth groove portion, and the fifth groove portion with respect to the tire circumferential direction are each larger than an inclination angle of the first groove portion with respect to the tire circumferential direction, wherein a rotation direction of said rear tire is a direction from the other side in the tire circumferential direction to the one side in the tire circumferential direction, and wherein a rotation direction of said front tire is a direction from the one side in the tire circumferential direction to the other side in the tire circumferential direction.

* * * * *